United States Patent [11] 3,600,070

[72] Inventor Rogers B. Downey
 Lexington, Mass.
[21] Appl. No. 873,279
[22] Filed Nov. 3, 1969
[45] Patented Aug. 17, 1971
[73] Assignee Polaroid Corporation
 Cambridge, Mass.

[54] CASSETTE MOTION PICTURE SYSTEM WITH UNIQUE GEAR ENGAGEMENT ARRANGEMENT
 15 Claims, 4 Drawing Figs.
[52] U.S. Cl. ............................................. 352/72,
 242/199, 352/173
[51] Int. Cl. ........................................ G03b 23/02,
 G03b 21/44
[50] Field of Search ................................. 352/72, 78,
 124, 173; 242/71.2, 198, 199, 200, 205

[56] References Cited
 UNITED STATES PATENTS
1,372,675 3/1921 Davis .......................... 352/72
2,275,497 3/1942 Berndt .......................... 242/200
3,386,675 6/1968 Thomsen ....................... 352/78 X Primary Examiner—Louis R. Prince
Assistant Examiner—Joseph W. Roskos
Attorneys—Brown and Mikulka, William D. Roberson and Robert L. Berger ABSTRACT: A motion picture system employing a cassette having a pair of coplanar spools to which the opposite ends of a strip of photographic material are connected. To facilitate reversible transport of the film strip between the aforementioned spools and across a film gate of the cassette, a spur gear is axially connected to each spool and positioned in one extremity of a specially configured recessed portion of the generally flat exterior surface of one cassette sidewall. Photographic apparatus adapted to receive such cassette and to alternately reversibly drive its spools includes a pair of coplanar fixedly positioned driving spur gears which respectively slide along the aforementioned recessed portions of the cassette into automatic engagement with the cassette's spur gears as the cassette is inserted thereinto.

PATENTED AUG 17 1971

3,600,070

INVENTOR.
ROGERS B. DOWNEY

BY Brown and Mikulka
and
Robert L. Berger
ATTORNEYS

PATENTED AUG 17 1971 3,600,070

INVENTOR.
ROGERS B. DOWNEY

BY Brown and Mikulka
and
Robert L. Berger
ATTORNEYS

CASSETTE MOTION PICTURE SYSTEM WITH UNIQUE GEAR ENGAGEMENT ARRANGEMENT

BACKGROUND OF THE INVENTION

1. Field of the Invention

This invention relates to photography and, more particularly, to a motion picture cassette system having an improved arrangement for advancing a strip of photographic material within the cassette housing.

2. Description of the Prior Art

Many important improvements have been made in recent years in motion picture photography to reduce or simplify the functions performed by the operator. In this respect, cassette or cartridge systems are now playing a major role in this rapidly expanding field. For example, film handling cassettes are now available which are adapted to be quickly mounted as a unit into a camera for exposure purposes. After the film has been exposed, the cassette containing the film can be quickly removed from the camera and mailed to a processing laboratory. Also, specially designed projectors are now available which accept quick mounting cassettes containing fully processed film. These latter systems not only greatly ease the job of projecting the film, but also provide a convenient and permanent storage container for the film, i.e., a cassette from which it is never necessary to withdraw the film for projection purposes.

Most recently, radically different cassette systems have been developed which permit the photographer himself to quickly and easily process and project a strip of motion picture film shortly after the pictures have been taken. Exemplary of such new and unique systems are those described in the following copending applications:

| Serial No. | Inventor(s) | Filing Date |
|---|---|---|
| 755,901 | Edwin H. Land | Aug. 28, 1968 |
| 761,771 | Rogers B. Downey | Sept. 23, 1968 |
| 767,609 | Herbert A. Bing | Oct. 15, 1968 |
| 766,481 | Rogers B. Downey | Nov. 18, 1968 |
| 722,789 | Vaito K. Eloranta Benjamin C. Ruggles | Nov. 1, 1968 |
| 788,897 | Rogers B. Downey | Jan. 3, 1969 |
| 813,427 | Rogers B. Downey | Apr. 4, 1969 |
| 813,469 | Rogers B. Downey | Apr. 4, 1969 |
| 813,568 | Rogers B. Downey Paul W. Thomas | Apr. 4, 1969 |
| 838,822 | Rogers B. Downey Gerald H. Cook | July 3, 1969 |
| 838,783 | Rogers B. Downey Philip G. Baker Gerald H. Cook | July 3, 1969 |
| 838,794 | Rogers B. Downey | July 3, 1969 |
| 838,793 | Philip G. Baker | July 3, 1969 |
| 838,832 | Rogers B. Downey Philip G. Baker Gerald H. Cook | July 3, 1969 |

All of these copending applications are assigned to the assignee of the present invention. The systems described in these applications employ a film handling cassette and, in most instances, one from which the film is not removed during the exposure, processing and projection operations.

In most prior art motion picture film handling cassette systems, there is a requirement for means to be included in photographic apparatus, adapted to receive the cassette, for selectively driving one or more film advancing spools mounted in the cassette. Typically, such apparatus includes a drive shaft, or shafts, located to be axially aligned with the appropriate spool, or spools, of the cassette, once the cassette has been positioned within that apparatus. Each such drive shaft is displaceably mounted for selective movement into engagement with its operably associated spool of the cassette. This type of arrangement, as well as other prior art techniques for driving the spools of motion picture cassettes, requires a multistep operation and/or relatively complex and expensive mechanisms for receiving the cassette into the photographic apparatus and effecting an engagement of that apparatus' driving system with the spool, or spools, of the cassette. The present invention is directed to obviating or eliminating limitations of this nature associated with current techniques for driving spools mounted within motion picture film handling cassettes.

One of the objects of this invention, therefore, is to provide an improved motion picture film handling cassette.

Another primary object of this invention is to provide a cassette of the type indicated which includes an improved arrangement for driving one or more spools housed therein.

An additional object of this invention is to provide photographic apparatus for receiving cassettes of the type indicated which includes an improved arrangement for driving one or more spools housed in such cassettes.

A further object of this invention is to provide a motion picture system, comprising a film handling cassette and photographic apparatus for receiving same, which system includes an improved arrangement for driving one or more spools of the cassette.

SUMMARY OF THE INVENTION

The motion picture system of this invention comprises a unique film handling cassette and a unique apparatus for receiving such a cassette and cooperating therewith to perform a photographic function. Importantly, this system includes a special arrangement for advancing a strip of photographic material within the housing of the cassette.

In its illustrated embodiment, the invention is employed in connection with the projection of visible images recorded on a film strip housed within the cassette. More specifically, the opposite ends of a strip of photographic material are respectively connected to coplanarly mounted spools of the cassette with a substantial portion of that photographic material initially coiled around one such spool. In order to provide means for effecting reversible transport of the film strip between the two spools, a spur gear is axially connected to each such spool. These gears are positioned in respective recessed portions of the generally flat exterior surface of one of the cassette's sidewalls. A channel extends from one edge of that sidewall into communication with each of the aforementioned recessed portions so as to form therewith a generally right angle depression in the sidewall's exterior surface.

The cassette also includes a film gate across which the film strip is transported in its advancement from its initial coiled position around one spool onto the cassette's other spool. Mounted behind the film strip in operable relationship to the cassette's film gate is a light reflecting element and, further, the cassette includes access means whereby light rays from an external light source may be introduced thereinto and onto its light reflecting element.

The projector adapted to receive the above-described cassette includes a pair of coplanarly mounted driving spur gears and an arrangement for selectively alternately driving these gears in opposite directions. These driving spur gears are positioned so that, as the cassette is inserted into the projector, they slide along the aforementioned channels into automatic engagement with the cassette's spur gears. Also, the projector includes a light source and a projection lens located to be in operable relationship with the cassette's light reflecting element and film gate, respectively, when the cassette is fully inserted thereinto.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

DESCRIPTION OF A PREFERRED EMBODIMENT

Figure 1:
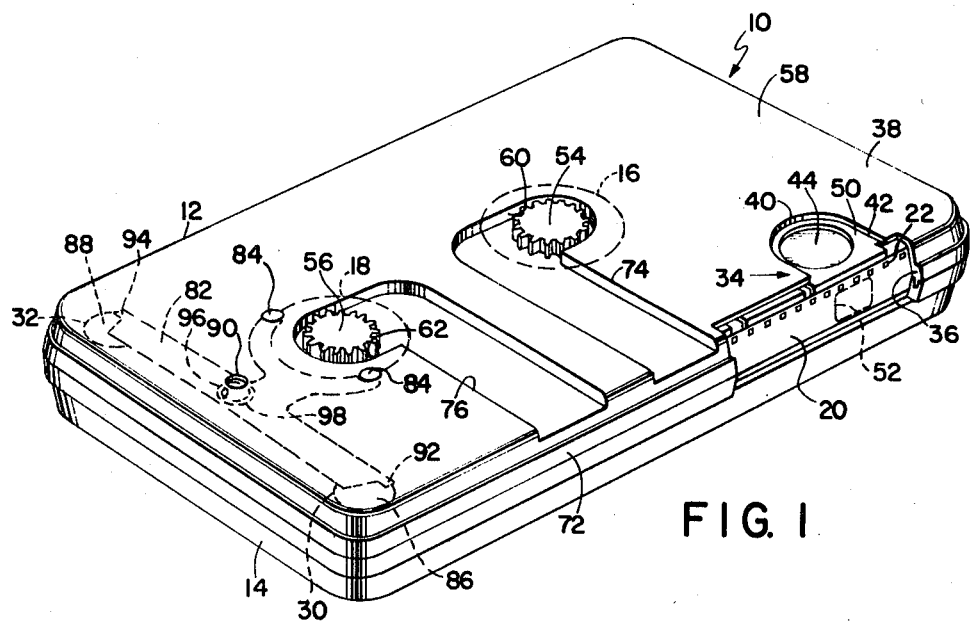
FIG. 1 is a diagrammatic perspective view of a motion picture film handling cassette embodying features of this invention.
Figure 2:
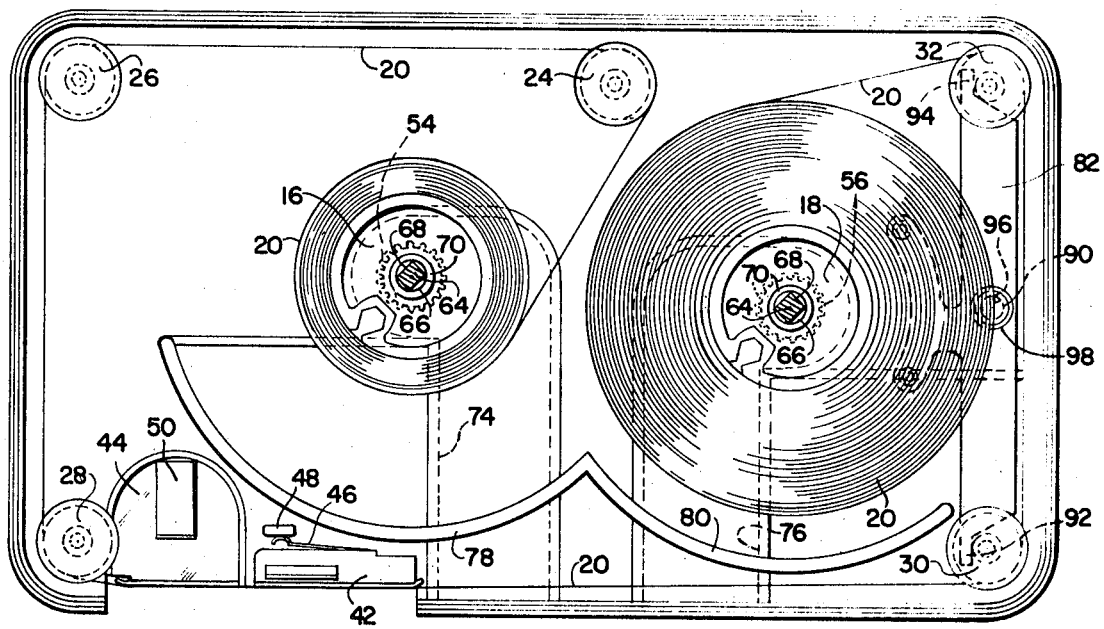
FIG. 2 is a diagrammatic interior plan view of the cassette shown in FIG. 1 illustrating the arrangement of certain elements housed therein.

The illustrated embodiment of this invention may best be understood by first referring to FIGS. 1 and 2 of the drawings, which illustrate a cassette exemplary of the types which may advantageously incorporate features of the present invention. As shown therein, a compact motion picture film handling cassette 10 is basically constituted by a pair of housing members 12 and 14 connected together to form an enclosed opaque housing. In this embodiment, the cassette 10 is relatively flat and generally rectangular parallel piped in configuration.

A supply spool 16 and a takeup spool 18 are coplanarly mounted within the cassette 10 for rotation about parallel axes. A motion picture film strip 20, containing a plurality of visible images and provided with perforations 22 and with leaders affixed to the supply spool 16 and takeup spool 18, is initially substantially entirely coiled around the supply spool. Passing from the supply spool 16 to the takeup spool 18, the strip of photographic material 20 sequentially travels around idlers 24, 26, 28, 30, and 32.

Intermediate the idler 28 and the idler 30 the film strip 20 passes through a projection station 34. In this connection, cutout portions of the housing members 12 and 14 define an opening or film gate 36 through which image carrying light rays may leave the cassette 10 and, further, through which an aperture plate (not shown) of a projector may be introduced into the cassette. Also, the sidewall 38 of the cassette 10 includes an opening 40 communicating with the film gate 36 for purposes which will subsequently become obvious. Mounted within the projection station 34 so as to be in alignment with the opening 36 is a pressure plate assembly 42 having an aperture 52 and which mounts a light reflecting element 44. It will be noted that this light reflecting element 44 is disposed in operable relationship to both the opening or film gate 36 and the opening 40 in the cassette's sidewall 38. Thus, for projection purposes, light rays from an externally mounted light source may be introduced into the cassette 10 through the opening 40 onto the reflecting element 44 which redirects those rays outwardly of the cassette through the pressure plate's aperture 52 and the section of film strip 20 disposed thereacross. Preferably, this light reflecting element 44 is prismatic in nature, and includes a concave light receiving transparent face adjacent the cassette's opening 40 and a flat reflecting surface which reflects light received into the element through its concave transparent face outwardly thereof through a convex transparent face adjacent the film strip 20.

The pressure plate assembly 42 also includes a leaf spring 46 which seats against a boss 48 formed integrally with the housing member 14 to continually urge that assembly toward the cassette's opening 36. This assembly 42 is mounted within the cassette 10 so that it may be displaced inwardly of the cassette away from the opening 36 against the force of the spring 46 whenever an aperture plate of a projector is positioned in operative relationship therewith. Forming part of the assembly 42 is a mounting bracket 50 which serves to fixedly position the light reflecting element 44 with respect to the pressure plate assembly and, more particularly, with respect to the aperture 52 of that assembly.

Axially connected to the supply spool 16 and to the takeup spool 18, respectively, are a pair of spur gears 54 and 56. It will be noted that these spur gears 54 and 56 are positioned flush with the generally flat exterior surface 58 of the cassette's sidewall 38. More specifically, these gears 54 and 56 are respectively mounted for rotation within recessed portions 60 and 62 of that sidewall 38. To facilitate a mounting arrangement of this type, each of the gears 54 and 56 may, for instance, be formed with, or mounted on, a rectangular shaft 64 which extends through an appropriate circular aperture 66 of the sidewall 38 into engagement with an appropriately configured aperture 68 of the respective spool 16 or 18. The end portions of these shafts 64 may be fused or otherwise fixedly connected to their respective spools 16 or 18. Suitable bearings 70 are formed on the inside face of the cassette's sidewall 38 to properly position the spools 16 and 18 for rotation within the cassette and to position the gears 54 and 56 in their respective recessed portions 60 and 62 of the housing member 12.

Extending from the edge 72 of the cassette 10, in which edge the opening or film gate 36 is formed, into communication with the recessed portions 60 and 62, respectively, are a pair of channels 74 and 76. These channels 74 and 76 are spaced closer together than are the axes of the spur gears 54 and 56 so as to respectively form, in conjunction with the recessed portions 60 and 62, substantially right angle depressions in the generally flat exterior surface 58 of the cassette's sidewall 38. This arrangement permits a pair of externally mounted coplanar driving spur gears to be displaced along the channels 74 and 76 from a position adjacent the cassette's edge 72 into engagement with the cassette's spur gears 54 and 56. When such externally mounted driving spur gears are adapted to alternately drive the cassette's gear 56 in a clockwise direction and the cassette's spur gears 54 in a counterclockwise direction, as viewed in FIG. 1 of the drawings, means are available to effect reversible transport of the film strip 20 between the spools 16 and 18 and through the projection station 34. Arcuate members 78 and 80 respectively serve to control the disposition of the film strip 20 around the spools 16 and 18 during such operations. It will be noted that, in an arrangement of this type, the plane of the axes of each cassette spur gear 54 and 56 and its associated externally mounted driving spur gear is generally perpendicular to the channels 74 and 76.

A resilient member 82 is connected to the inside face of the housing member 12 by any suitable means, such as rivets 84, and extends over, and in spaced relationship to, the end surfaces 86 and 88 of the idlers 30 and 32, respectively. Provided through the housing member 12 is an aperture 90 disposed over the resilient member 82 whereby an external force applying member may be selectively introduced into the cassette 10 to urge the resilient member's end portions 92 and 94 into frictional engagement with the idlers 30 and 32, respectively, to restrain further rotational movement of those idlers. In order to effectively light seal the interior of the cassette 10, a ring 96 may be mounted on the resilient member 82 in coaxial alignment with respect to the aperture 90 and adapted to seat in an annular recess 98 of the inside face of the housing member 12.

Idler 28, around which the film strip 20 passes on its way from the supply spool 16 to the pressure plate assembly 42 may, if desired, be mounted on a movable post spring biased toward the corner which it occupies in the housing of the cassette 10 and capable of being moved resiliently inward away from that corner. Also, idler 30 may be spring biased toward the corner which it occupies in the housing of the cassette 10 and capable of being moved resiliently inward away from that corner. This represents one way to minimize strain exerted on the film strip 20 by the conventional intermittent film advancement structure of a projector during projection operations.

It will be appreciated that the housing members 12 and 14, as well as elements associated therewith, e.g., the arcuate members 78 and 80, the bearings 70, the boss 48 and the mounting structure for the idlers 24, 26, 28, 30 and 32, may, for example, be formed from a suitable thermoplastic resin, such as an acrylic or a polystyrene, in an inexpensive injection molding process. Similarly, the spur gears 54 and 56 and the shaft 64 associated therewith, the idlers 24, 26, 28, 30 and 32 and the spools 16 and 18 may, if desired, be formed by injection molding processes employing the same types of material.

Various details of the cassette 10 do not constitute part of the present invention and, obviously, may readily take forms other than those described. Some of these features, e.g., the snubbing arrangement, the pressure plate assembly, the light reflecting element and the film gate arrangement, are the subject of certain of the aforementioned copending applications.

Figure 3:
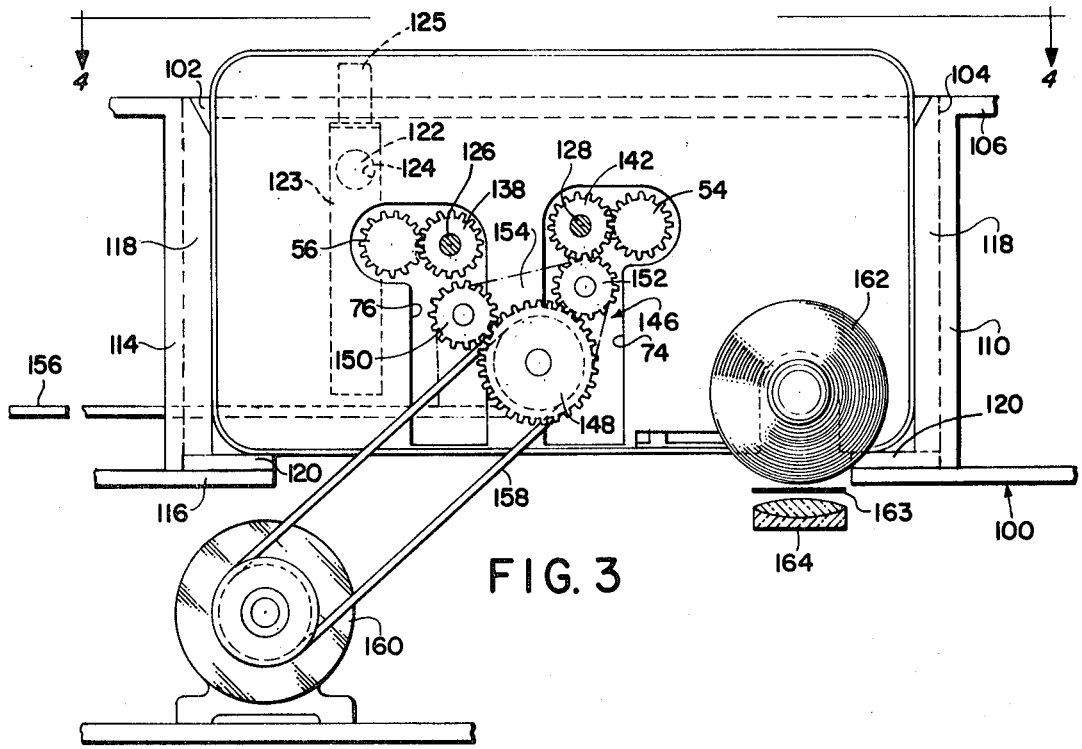
FIG. 3 is a fragmentary diagrammatic vertical sectional view of a motion picture projector adapted to receive the cassette illustrated in FIG. 1 and showing such a cassette positioned therein.
Figure 4:
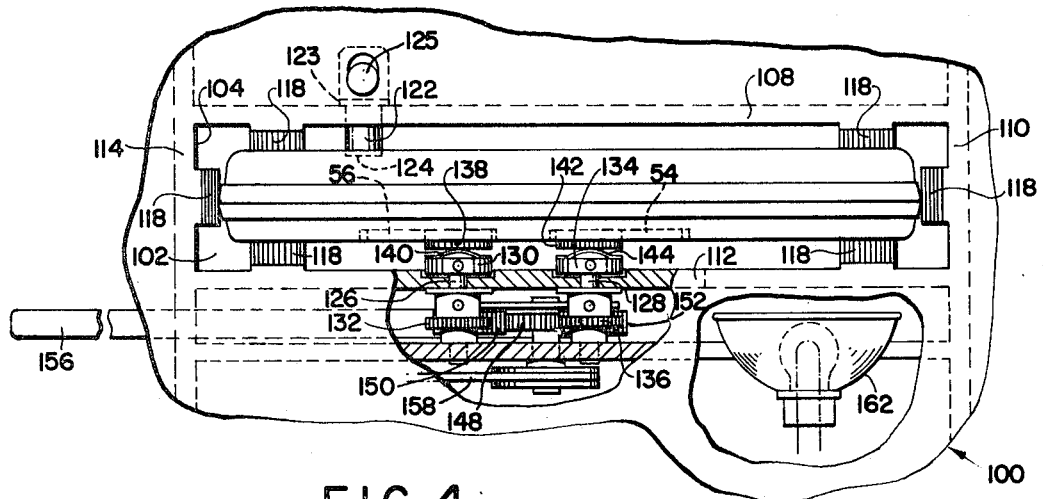
FIG. 4 is a fragmentary partially cutaway sectional view taken generally along line 4-4 of FIG. 3.

Referring now to FIGS. 3 and 4 of the drawings, a projector unit 100 is illustrated in part that includes a cassette receiving chamber 102. Insertion of the cassette 10 into the receiving chamber 102 is effected through a slot 104 provided in the top panel 106 of that unit and with the edge 72 containing the opening or film gate 36 first passing thereinto. The cassette's receiving chamber 102 is formed of interconnected support plates 108, 110, 112, 114 and 116. A plurality of elongated standoffs 118, mounted in vertical alignment on the support plates 108, 110, 112 and 114 and extending from those plates interiorly of the cassette receiving chamber 102, and a pair of standoffs 120, extending between the support plates 108 and 112, in combination, serve to first guide the cassette 10 into that chamber and, once the cassette has been fully inserted therein, to support and align the cassette. Typically, the support plates 108, 110, 112, 114 and 116 are formed from a material such as stainless steel while the standoffs 118 and 120 are formed from a polymeric material such as a polytetrafluorathylene. In this respect, the cassette 10 is seated against the standoffs 120 when fully inserted into the receiving chamber 102. Preferably, this chamber 102 is oriented within the projector 100 so that the cassette 10 is inserted vertically downward thereinto (as viewed in the drawings) through the slot 104. In this particular embodiment, subsequent removal of the cassette 10 from the projector unit 100 is facilitated by a portion of the cassette 10 which remains accessible above the projector's top panel 106.

The projector 100 includes a detent 122 disposed through the support plate 108 and biased by a leaf spring 123 inwardly of the receiving chamber 102. As the cassette 10 is inserted into the receiving chamber 102, its edge 72 contacts the detent 122 and displaces it outwardly of the receiving chamber to permit complete insertion of the cassette into that chamber. Provided in the outside face of the cassette's housing member 14 is a recess 124 into which the spring biased detent 122 moves at such time as the cassette 10 is fully inserted into the projector unit 100. This arrangement serves to lock the cassette 10 in the projector 100. The operator may depress a button 125 to withdraw the detent 122 from the recess 124 to facilitate subsequent removal of the cassette 10 from the projector unit 100.

Appropriately journaled to support the structure within the projector unit 100 are a pair of spaced-apart drive shafts 126 and 128. Spur gears 130 and 132 are fixedly mounted in spaced-apart relationship on the drive shaft 126. Similarly, spur gears 134 and 136 are fixedly mounted on the drive shaft 128 in spaced-apart relationship. At one end of the drive shaft 126 there is mounted a driving spur gear 138 which is connected to the gear 130 through a slip clutch arrangement 140. A second driving spur gear 142 is mounted on an end of the drive shaft 128 in coplanar alignment with the gear 138 being connected to the spur gear 134 through a slip clutch arrangement 144. A combination of gears 146, consisting of a spur gear 148 and pinions 150 and 152, is mounted on a bracket 154 for pivotable movement about the axis of the gear 148 responsive to the displacement of a lever arm 156, one end of which lever arm extends exteriorly of the projector's housing.

Since the pinions 150 and 152 are disposed in the plane of the spur gears 132 and 136, the lever arm 156 may be selectively displaced to alternately engage the pinion 150 with the gear 132 or the pinion 152 with the gear 136. The spur gear 148 is connected to a motor 160 of the projector unit 100 through a belt 158. It is important to note that the driving spur gears 138 and 142 are disposed within the projector 100 so as to slide along the cassette's channels 76 and 74, respectively, into automatic engagement with the cassette's gears 56 and 54 in the process of inserting the cassette 10 into the projector's receiving chamber 102.

Also mounted within the projector unit 100 are other components normally included in such units such as a lamp 162, a shutter mechanism 163 and a projection lens element 164 which are positioned in operable relationship with the cassette's opening 40 and film gate 36 whenever the cassette 10 is fully inserted into the receiving chamber 102. The projector unit 100 further includes an aperture plate and an intermittent film advancement mechanism (not shown) which are automatically positioned in operable relationship with the section of the film strip 20 disposed across the cassette's opening 36 and the cassette's pressure plate assembly 42 at such times as the cassette 10 is seated against the standoffs 120. In this connection, and as previously indicated, the projector's aperture plate engages the film strip 20 against the cassette's pressure plate assembly 42 and displaces that assembly inwardly of the cassette 10 to position the film strip in the proper plane for projection purposes. The projector unit 100 may be of a type employing a rear projection screen or, alternately, of the type from which image carrying light rays are projected onto a remotely located screen. These elements of the projector system, i.e., the lamp 162, the shutter mechanism 163, the projection lens element 164, the aperture plate, the intermittent film advancement mechanism and the screen, do not by themselves form a part of the present invention and, as such, may take a variety of conventional or special forms within the scope of this invention.

If desired, the shafts 126 and 128 to which the gears 138 and 142 are respectively connected may be resiliently mounted in their operational positions in a conventional manner. Such an arrangement permits these gears 138 and 142 to be automatically and temporarily resiliently displaced out of their operational positions to accommodate any initial misalignment between their teeth and those of the cassette's gears 56 and 54 when the cassette 10 is inserted into the projector unit 100.

It will thus be recognized that, by inserting the cassette 10 into the projector unit 100 and by selective operation of the lamp 162, the motor 160 and the lever arm 156, an operator may effect selective reversible transport of the film strip 20 within the cassette 10 between the spools 16 and 18 for projection and/or rewind operations. During projection operations, a pin (not shown) of the projector 100 is introduced through the cassette's aperture 90 to snub the idlers 30 and 32.

A motion picture system is thus provided which simply and automatically effects an engagement of the cassette's supply and takeup spools 16 and 18 with the driving means of the projector 100 whenever the cassette 10 is inserted thereinto. The exterior surface of the cassette 10 is relatively flat and smooth, having no projecting parts. No mechanical movement is necessary within the projector 100 to effect an engagement of the cassette's spools 16 and 18 with the drive means of the projector. The special configurations of the depressions respectively formed by the cassette's recessed portion 60 and channel 74 and recessed portion 62 and channel 76 automatically effects the accurate effective alignment of the driving gear 142 with the supply spool of gear 54 and of the driving gear 138 with the takeup spool's gear 56. More specifically, when these pairs of gears 142, 54 and 138, 56 are engaged, they are disposed in horizontal alignment on accurately predetermined center distances. This arrangement provides an efficient drive system having minimum resistance and one wherein the gear teeth are subjected to minimum wear.

It will be appreciated that the cassette 10 may initially be furnished with its strip of photographic material 20 in a photosensitive state, in which instance, the arcuate members 78 and 80 additionally serve a light sealing function and the film gate 36 is adapted to constitute an exposure station. Such a cassette 10 may then be inserted into an appropriate camera (not shown) comprising conventional components common to such photographic apparatus. When positioned in the camera, that apparatus' aperture plate is received into the cassette 10 through its opening or film gate 36 and engages the film strip 20 against the pressure plate assembly 42 to position the film strip at the proper focal plane. Drive means of the camera engage the cassette's gear 56 while the camera's intermittent claw mechanism engages the perforations of the film strip 20 across the film gate 36. Simultaneously, the camera's lens and shutter mechanism serve to focus an image of the scene being photographed onto the film strip 20 as it traverses the film gate 36.

The terms "projection," "projection unit," "projector," etc., are used herein in a comprehensive sense, i.e., to broadly refer to those systems wherein the visible images recorded on a sheet of material are reimaged for viewing purposes and are not restricted to only those systems in which the recorded visible images are projected onto a screen of one type or another.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

I claim:

1. A motion picture film cassette comprising:
   a housing having at least one sidewall with a generally flat exterior surface;
   a strip of photographic material adapted to have images recorded thereon, or having images recorded thereon, and having at least a substantial portion of its length coiled within said housing;
   a station in said housing to facilitate the recording of such images on said strip of photographic material, or the projection of such recorded images for viewing purposes, as said strip of photographic material is advanced therethrough;
   a spool mounted within said housing for rotation about an axis substantially perpendicular to said generally flat exterior surface of said wall, one end of said strip of photographic material being connected to said spool whereby rotation of said spool advances said strip of photographic material within said housing through said station; and
   a spur gear connected to said spool, said generally flat exterior surface of said sidewall being provided with a recessed portion in which said spur gear is positioned in parallel alignment with said exterior surface of said sidewall and a channel extending from an edge of said sidewall into communication with said recessed portion configured to permit an exteriorly mounted driving spur gear to be displaced therealong in coplanar relationship with said cassette spur gear into engagement with said cassette spur gear.

2. The cassette of claim 1 wherein said recessed portion and said channel substantially define a right angle depression within said exterior surface of said sidewall to facilitate the engagement of said gears with the common plane of their axes extending generally perpendicularly to the direction which such exteriorly mounted gear is displaced along said channel.

3. The cassette of claim 1 wherein the exposed face of said cassette gear does not extend beyond said generally flat exterior surface of said sidewall.

4. The cassette of claim 3 wherein said exposed face of said cassette gear is flush with said generally flat exterior surface of said sidewall.

5. The cassette of claim 1 additionally comprising:

a second spool to which the other end of said strip of photographic material is fastened and around which said substantial portion of said strip of material is initially coiled; and
a second spur gear connected to said second spool to effect the return of said substantial portion of said strip of photographic material to and around said second spool subsequent to said advancement thereof through said station, said generally flat exterior surface of said sidewall being provided with a second recessed portion in which said second spur gear is positioned in parallel alignment with said exterior surface of said sidewall and a second channel extending from said edge of said sidewall into communication with said second recessed portion configured to permit a second exteriorly mounted driving spur gear to be displaced therealong in coplanar relationship with said second cassette spur gear into engagement with said second cassette spur gear as such first mentioned exteriorly mounted driving spur gear is displaced along said first mentioned channel into engagement with said first mentioned cassette spur gear.

6. The cassette of claim 5 wherein said first mentioned recessed portion and said first mentioned channel and said second recessed portion and said second channel respectively substantially define right angle depressions within said exterior surface of said sidewall to facilitate the engagement of said gears with the common plane between the axes of each pair of said engaged gears extending generally perpendicularly to the direction which said exteriorly mounted gears are displaced along said channels.

7. The cassette of claim 6 wherein the exposed faces of said cassette gears do not extend beyond said generally flat exterior surface of said sidewall.

8. The cassette of claim 7 wherein said exposed faces of said cassette gears are flush with said generally flat exterior surface of said sidewall.

9. The cassette of claim 5 wherein said channels are spaced closer together than are the axes of said first mentioned cassette spur gear and said second cassette spur gear.

10. A motion picture system comprising:
   a film handling cassette including:
      a housing having at least one sidewall with a generally flat exterior surface;
      a strip of photographic material having visible images recorded thereon and having at least a substantial portion of its length coiled within said housing;
      a station in said housing to facilitate the projection of said images for viewing purposes as said strip of photographic material is advanced therethrough;
      a spool mounted within said housing for rotation about an axis substantially perpendicular to said generally flat exterior surface of said wall, one end of said strip of photographic material being connected to said spool whereby rotation of said spool advances said strip of photographic material within said housing through said station; and
      a spur gear connected to said spool, said generally flat exterior surface of said sidewall being provided with a recessed portion in which said spur gear is positioned in parallel alignment with said exterior surface of said sidewall and a channel extending from an edge of said sidewall into communication with said recessed portion configured to permit an exteriorly mounted driving spur gear to be displaced therealong in coplanar relationship with said cassette spur gear into engagement with said cassette spur gear; and
   a photographic apparatus including:
      means for receiving said cassette including a slot through which said cassette is inserted;
      means for selectively driving said cassette spur gear including a driving spur gear mounted to be in alignment with said channel as said cassette is inserted into said receiving means, to be displaced along said channel as said cassette is being inserted into said receiving means and to automatically engage said cassette spur gear when said cassette is fully inserted into said receiving means;

means for releasably retaining said cassette in fixed position within said receiving means when said cassette is fully inserted thereinto; and means cooperating with said cassette station when said cassette is fully inserted into said receiving means for projecting said images for viewing purposes, whereby said strip of material may be selectively advanced through said station to said spool.

11. A motion picture system comprising:
a film handling cassette including:
  a housing having at least one sidewall with a generally flat exterior surface;
  a first spool mounted within said housing for rotation about an axis substantially perpendicular to said generally flat exterior surface of said wall;
  a second spool mounted within said housing for rotation about an axis spaced from and parallel to the axis of said first spool;
  a strip of photographic material having visible images recorded thereon, the opposite ends thereof being connected to respective said spools and a substantial portion thereof initially coiled around said first spool;
  a station in said housing to facilitate the projection of said images for viewing purposes as said strip of photographic material is advanced therethrough;
  a first spur gear connected to said first spool, said generally flat exterior surface of said sidewall being provided with a first recessed portion in which said second spur gear is positioned in parallel alignment with said exterior surface of said sidewall and a second channel extending from said edge of said sidewall into communication with said second recessed portion configured to permit a second exteriorly mounted driving spur gear to be displaced therealong in coplanar relationship with said second cassette spur gear into engagement with said second cassette spur gear; and
a photographic apparatus including:
  means for receiving said cassette including a slot through which said cassette is inserted;
  means for selectively reversibly driving respective said cassette spur gears including a first driving spur gear and a second driving spur gear mounted to be respectively in alignment with said first and second channels as said cassette is inserted into said receiving means, to be respectively displaced along said first and second channels as said cassette is being inserted into said receiving means and to respectively automatically engage said first and second cassette spur gears when said cassette is fully inserted into said receiving means;
  means for releasably retaining said cassette in fixed position within said receiving means when said cassette is fully inserted thereinto; and
means cooperating with said cassette station when said cassette is fully inserted into said receiving means for projecting said images for viewing purposes as said strip of photographic material is advanced through said station, whereby said strip of photographic material may be selectively reversibly advanced between said spools and through said station.

12. The system of claim 11 wherein said apparatus additionally includes a motor and means for alternately connecting said motor to said first and second driving spur gears.

13. Apparatus for use with a cassette including a housing having at least one sidewall with a generally flat exterior surface, a strip of photographic material having visible images recorded thereon and having at least a substantial portion of its length coiled within such housing, a station in such housing adapted to facilitate the projection of such images for viewing purposes as such strip of photographic material is advanced therethrough, a spool mounted within such housing for rotation about an axis substantially perpendicular to such generally flat exterior surface of such wall, one end of such strip of photographic material being connected to such spool whereby rotation of such spool advances such strip of material within such housing through such station onto such spool, and a spur gear connected to such spool, such generally flat exterior surface of such sidewall being provided with a recessed portion in which such spur gear is positioned in parallel alignment with such exterior surface of such sidewall and a channel extending from an edge of such sidewall into communication with such recessed portion configured to permit an exteriorly mounted driving spur gear to be displaced therealong in coplanar relationship with such cassette spur gear into engagement with such cassette spur gear, comprising:
  means for receiving such cassette including a slot through which such cassette is inserted;
  means for selectively driving such cassette spur gear including a driving spur gear mounted to be in alignment with such channel as such cassette is inserted into said receiving means, to be displaced along such channel as such cassette is being inserted into said receiving means and to automatically engage such cassette spur gear when such cassette is fully inserted into said receiving means;
  means for releasably retaining such cassette in fixed position within said receiving means when such cassette is fully inserted thereinto; and
  means cooperating with such cassette station when such cassette is fully inserted into said receiving means for projecting such images for viewing purposes, whereby such strip of material may be selectively advanced within such housing through such station onto such spool.

14. The invention of claim 13 wherein such cassette additionally includes a second spool, to which the other end of such strip of photographic material is fastened and around which such substantial portion of such strip of photographic material is initially coiled, and a second spur gear connected to such second spool to effect the return of such substantial portion to and around such second spool subsequent to such advancement thereof through such station, such generally flat exterior surface of such sidewall being provided with a second recessed portion in which such second spur gear is positioned in parallel alignment with such exterior surface of such sidewall and a second channel extending from such edge of such sidewall into communication with such second recessed portion configured to permit a second exteriorly mounted driving spur gear to be displaced therealong in coplanar relationship with such second cassette spur gear into engagement with such second cassette spur gear, and wherein said apparatus additionally comprises means for selectively driving such second cassette spur gear including a second driving spur gear mounted to be in alignment with such second channel as such cassette is inserted into said receiving means, to be displaced along such second channel as such cassette is being inserted into said receiving means and to automatically engage such second cassette spur gear when such cassette is fully inserted into said receiving means, whereby said first mentioned and second driving spur gears can be selectively alternately energized to effect reversible transport of such strip of material between such first mentioned and second cassette spools and through such station.

15. The invention of claim 14 wherein such cassette station includes a film gate across which such strip of photographic material is transported during such advancement thereof, a light reflecting element positioned in operable relationship with such film gate with the section of such strip of photographic material disposed thereacross during such advancement thereof and access means for permitting light rays from an external light source to be introduced into such cassette onto such light reflecting element and wherein said cooperating means of said apparatus comprises a light source positioned to be in operable relationship with such access means and such cassette light reflecting element and a projection lens and shutter mechanism positioned to be in operable relationship with such film gate when such cassette is fully inserted into said receiving means.